Nov. 16, 1926.

G. M. EATON 1,606,753

RAILWAY MOTOR MOUNTING

Filed July 15, 1920      2 Sheets-Sheet 1

WITNESSES:
H. J. Shelhamer
H. C. Lowe

INVENTOR
George M. Eaton
BY
Wesley G. Carr
ATTORNEY

Nov. 16, 1926.

G. M. EATON 1,606,753

RAILWAY MOTOR MOUNTING

Filed July 15, 1920  2 Sheets-Sheet 2

WITNESSES:
H. J. Shelhamer
H. C. Lowe

INVENTOR
George M. Eaton
BY
Wesley G. Carr
ATTORNEY

Patented Nov. 16, 1926.

1,606,753

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

RAILWAY-MOTOR MOUNTING.

Application filed July 15, 1920. Serial No. 396,527.

My invention relates to a mounting for a railway motor and truck and has particular relation to such a mounting for safety cars.

One object of my invention is to provide an integral member or body comprising a motor frame, a gear case, a pinion end housing, an axle-bearing housing, a car journal, a support for the springs upon which a car body is suspended and which shall have a minimum number of joints below a predetermined plane.

Another object of my invention is to provide a single system of oil lubrication for the axle bearings, gear wheel, pinion and armature bearings and thereby secure better lubrication than with present standard structures.

A further object of my invention is to obtain a greater ratio between the sizes of the gear and pinion, thereby permitting the installation of a motor with a relatively greater speed than any that have heretofore been employed.

A further object of my invention is to provide a truck which may readily be removed from under a car and which is so constructed that a motor armature may readily be removed from the stator frame of the truck motor to make repairs thereof.

Heretofore, it has been customary to provide a separate motor frame, which is mounted upon a truck. The gears and pinion were lubricated with grease, and the ratio between the gear wheel and pinion was approximately five to one. Oil lubrication could not be employed successfully because of the large number of joints in the gear case and mounting which were below the oil level.

By my invention, I provide a mounting for a motor and gears for actuating a car axle, which has a minimum number of joints below a predetermined level, thereby making it possible to provide a system of oil lubrication and thus employ a motor with a relatively greater speed and a pinion with a relatively smaller diameter, than any heretofore employed in street railway cars.

Briefly speaking, my invention consists of providing an integral casting or unitary structure having a stator frame, a pinion end housing, a gear case, an axle bearing housing and car journal, a spring support, and a system of splash lubrication for the bearings thereof.

For a better understanding of my invention, reference may now be had to the accompanying drawings, Fig. 1 of which is a view, in top plan elevation, of an integral casting or unitary structure comprising an axle-bearing housing, car journals, a support for springs upon which a car is suspended, a stator frame, a pinion end housing and a gear case. The casting is shown mounted upon an axle and wheels.

Figure 1:
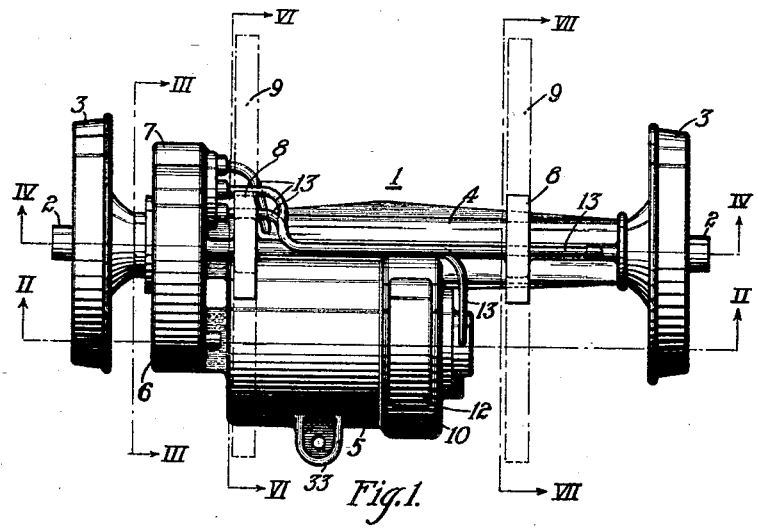

In Fig. 1 is shown an integral structure or casting 1 mounted upon an axle 2 and wheels 3. The structure 1 comprises an axle-bearing housing 4, a motor frame 5, a pinion end housing 6, a gear case 7, supports 8 for springs 9 (shown by broken lines) upon which a car body is supported. The member 1 may be a unitary casting or may be made of pressed shapes which may be so welded as to become an integral body. A commutator end housing 10 is independent of the motor frame 5 and is secured thereto. Detachable covers 11 and 12 are provided for the gear case 7 and the commutator end housing 10, respectively. Pipes 13 distribute oil from the gear case 7 to journal and armature bearings.

Figure 2:
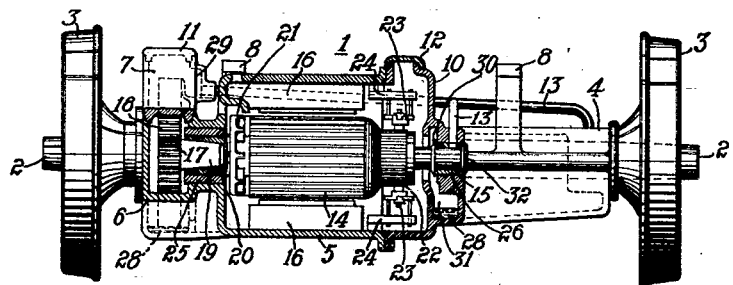
Fig. 2 is a view, partially in side elevation and partially in section, of the motor, pinion and mounting that is shown in Fig. 1, taken along the line II—II of Fig. 1.

Referring to Fig. 2, a rotor, provided with an armature 14, is shown mounted upon a shaft 15 within the motor frame 5, to which a stator comprising field poles 16 is secured. The armature 14 actuates a pinion 17 which drives a gear wheel 18. The pinion 17 is preferably formed with an integral portion 19 of reduced cross-sectional area which is pressed into an opening 20 in the shaft 15. A bushing or bearing 25, which is of larger diameter than the pinion 17, surrounds that portion of the shaft 15 into which the portion 19 projects and constitutes a bearing therefor. A fan 21 is securely mounted upon the pinion end of the shaft 15 and is of slightly less diameter than the armature 14. A commutator 22 is mounted upon the shaft 15, and brushes 23 cooperate therewith. The brushes 23 are secured to the frame 5 by means of detachable brush arms 24. The shaft 15 is provided with bearings 25 and 26 at the pinion and commutator ends, respectively, of the motor.

The gear wheel 18 splashes oil 28, which is contained in the bottom portion of the gear case 7, into a pocket 29 from which the pipes 13 conduct it to different bearings. An annular disk or wiper 30 is mounted upon the shaft 15 to take the end thrust and to prevent oil from flowing to the commutator and to deflect it downward to a pocket 31 in the commutator end housing 10 from which it flows into the axle-bearing housing 4 and from thence to the gear case 7. An end plate 32, which covers an end of the axle 15, is attached to the commutator end housing 10.

When it becomes necessary to repair the motor or pinion, the commutator end housing 10 is forced from the motor frame 5 upon which it has been pressed and the brushes 23 are removed or swung outwardly. The rotor comprising the armature 14, the shaft 15, the commutator 22 and the pinion 17 may be withdrawn through the opening made by removing the end housing 10. By having the overall length of the shaft 15 and the pinion 17 approximately the same as the distance from the stator 16 to the wheel 3 which is adjacent to the commutator 22, it is possible, by tilting the motor, to remove it from the motor frame 5 without taking the wheel 3 from the axle. It is apparent that by decreasing the overall length of the shaft 15 and pinion 17 the rotor could more easily be removed.

Figure 3:
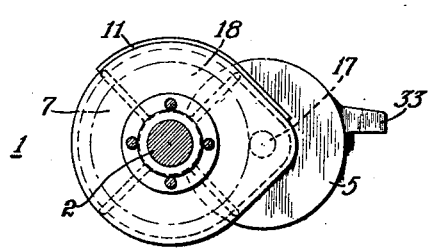
Fig. 3 is a view, partially in end elevation and partially in section, of the gear case, pinion end housing and motor frame shown in Fig. 1, taken along the line III—III of Fig. 1.

Fig. 3 is a view, in side elevation, of the pinion end housing 6 and gear case 7 provided with the detachable cover 11, which is of sufficient size to permit the removal of the gear wheel 18 therethrough. The relative size of the pinion 17 and the gear wheel 18 is best shown by this view; the ratio of their pitch diameters being as 1 is to 8.18. The motor frame is provided with a projecting lug 33 for supporting it by springs upon the car frame, not shown. This lug takes the torque of the motor.

Figure 4:
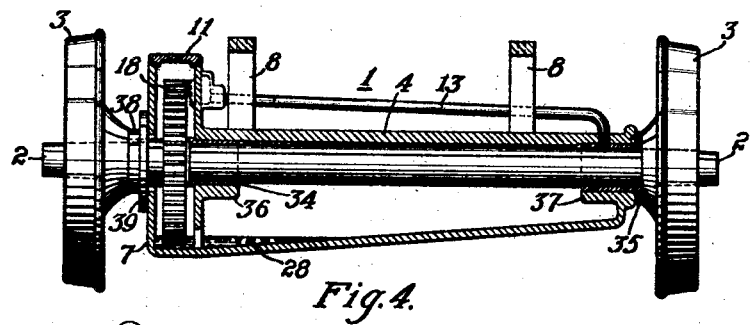
Fig. 4 is a view, partially in section and partially in side elevation, of the gear case, the axle-bearing housing and car journals shown in Fig. 1, taken along the line IV—IV of Fig. 1.

Fig. 4 is a view, partially in cross-section and partly in side elevation, of the axle bearing housing 4 and gear case 7 mounted on a shaft 2. To assemble the parts shown in this view, axle bearings 34 and 35 are positioned in journals 36 and 37, respectively, provided in the housing 4. A bearing 38 is provided for an annular collar 39, which is attached to the side of the gear case 7. The gear wheel 18 is lowered in the gear case 7 and the axle 2, which is provided with tapered ends, is inserted through the journals 35 and 36 in the order named and the gear wheel 18 is pressed thereon. The wheels 3 are then pressed on the tapered ends of the axle 2.

The slope of the bottom of the axle bearing housing 4 causes the oil to flow toward the gear case 7 where the gear wheel 18 carries it up to the pocket 29 as heretofore described.

Figure 5:
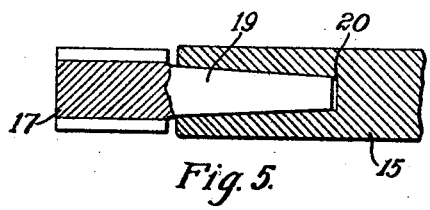
Fig. 5 is an enlarged cross-sectional view of the pinion and the armature shown in Fig. 2.

Fig. 5 is an enlarged cross-sectional view of the pinion 17 having a relatively long stud portion 19 which is pressed into the recess 20 of the armature shaft 15.

Figure 6:
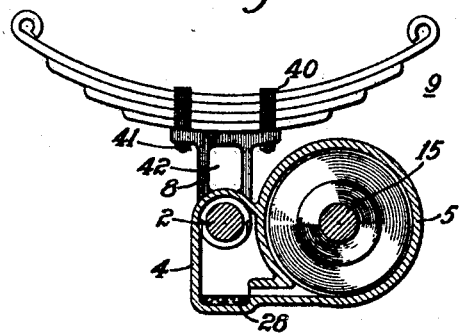
Figs. 6 and 7 are cross-sectional views of the axle-bearing housing, showing the supports for the car springs, taken along the lines VI—VI and VII—VII, respectively of Fig. 1.
Figure 7:
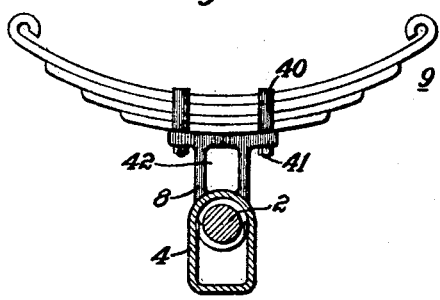

Figs. 6 and 7 are views, partially in elevation and partially in cross-section, showing the manner in which the springs 9, which support the car body, are detachably mounted upon supports 8 which are integral parts of the mounting 1, by means of straps 40 and bolts 41. An opening 42 is provided in each of supports 8 for inserting pipes 13 therethrough.

It will be observed by those skilled in the art that by my invention I have provided an integral motor mounting for an electrically operated car which is of relatively simple and economical construction, of great durability, and, that a motor of relatively greater speed than heretofore, may be employed because of the system of lubrication which the mounting permits.

While I have shown my invention in its preferred form, it will be observed by those skilled in the art that it is not so limited, but that it is susceptible of various minor alterations and changes without departing from the spirit thereof, and I desire, therefore, that only such limitations shall be placed thereupon as are imposed by the prior art or as are specifically set forth in the appended claims.

I claim as my invention:

1. A railway drive mechanism comprising a motor frame and axle housing, an armature and wheel axle respectively journalled therein, a gear train connecting said armature and axle, a gear case and pinion housing for said train, said motor frame, axle housing, gear case and pinion housing constituting a unitary member, and means for lubricating the armature shaft and axle journals from a common source.

2. A railway drive mechanism comprising a motor frame and axle housing, an armature and wheel axle respectively journalled therein, a gear train connecting said armature and axle, a gear case and pinion housing for said train, said motor frame, axle housing, gear case and pinion housing constituting an integral member, and means for lubricating the armature shaft and axle journals from a common source.

3. A railway drive mechanism comprising a motor frame and axle housing, an armature and wheel axle respectively journalled therein, a gear train connecting said armature and axle, a gear case and pinion housing for said train, a pipe system communicating with said gear case, the axle journals and motor bearings, and means for circulating a lubricant through said pipe system and gear case.

4. A railway drive mechanism comprising a motor frame and axle housing, an armature and wheel axle respectively journalled therein, a gear train connecting said armature and axle, a gear case and pinion housing for said train, a collar secured to said armature shaft to take the lateral thrust of the armature and to prevent the flow of lubricant to the commutator, a pipe system communicating with said gear case, the axle journals and motor bearings, and means for circulating a lubricant through said pipe system and gear case.

In testimony whereof, I have hereunto subscribed my name this 9th day of July, 1920.

GEORGE M. EATON.